(12) United States Patent
Odorczyk

(10) Patent No.: US 11,719,425 B2
(45) Date of Patent: Aug. 8, 2023

(54) BULB HAVING TWO-LEVEL ILLUMINATION

(71) Applicant: James Odorczyk, Estero, FL (US)

(72) Inventor: James Odorczyk, Estero, FL (US)

(*) Notice: Subject to any disclaimer, the term of this patent is extended or adjusted under 35 U.S.C. 154(b) by 600 days.

(21) Appl. No.: 16/724,471

(22) Filed: Dec. 23, 2019

(65) Prior Publication Data

US 2020/0232632 A1 Jul. 23, 2020

Related U.S. Application Data

(60) Provisional application No. 62/794,025, filed on Jan. 18, 2019.

(51) Int. Cl.

| F21V 23/04 | (2006.01) |
|---|---|
| F21K 9/232 | (2016.01) |
| F21K 9/238 | (2016.01) |
| F21V 23/02 | (2006.01) |
| H05B 45/10 | (2020.01) |
| H02J 7/00 | (2006.01) |
| H05B 47/11 | (2020.01) |
| H05B 47/115 | (2020.01) |
| H02J 7/34 | (2006.01) |
| F21V 23/06 | (2006.01) |
| F21Y 115/10 | (2016.01) |
| H05B 45/382 | (2020.01) |

(52) U.S. Cl.
CPC .......... *F21V 23/0471* (2013.01); *F21K 9/232* (2016.08); *F21K 9/238* (2016.08); *F21V 23/023* (2013.01); *F21V 23/0464* (2013.01); *H02J 7/0068* (2013.01); *H05B 45/10* (2020.01); *H05B 47/11* (2020.01); *H05B 47/115* (2020.01); *F21V 23/06* (2013.01); *F21Y 2115/10* (2016.08); *H02J 7/345* (2013.01); *H05B 45/382* (2020.01)

(58) Field of Classification Search
CPC .............. F21V 23/0471; F21V 23/023; F21V 23/0464; H05B 47/115; H05B 47/11; H05B 45/10; H02J 7/0068; H02J 7/345
See application file for complete search history.

(56) References Cited

U.S. PATENT DOCUMENTS

| 6,280,053 | B1 | 8/2001 | Chien | |
|---|---|---|---|---|
| 9,024,536 | B2 | 5/2015 | Maxik et al. | |
| 9,955,551 | B2* | 4/2018 | Spero | F21K 9/23 |
| 10,004,122 | B1* | 6/2018 | Li | F21K 9/232 |
| 10,104,742 | B2* | 10/2018 | Halliwell | H05B 45/20 |
| 2008/0295371 | A1* | 12/2008 | Hsu | G09F 13/18 40/570 |
| 2012/0098655 | A1* | 4/2012 | Preta | F21S 9/022 307/66 |

(Continued)

*Primary Examiner* — Alexander H Taningco
*Assistant Examiner* — Pedro C Fernandez
(74) *Attorney, Agent, or Firm* — Louis S. Horvath

(57) ABSTRACT

A light bulb has a first internal circuit that is configured to generate, from received external line power, a first illumination above a first brightness value. An internal charge storage element is configured to store electrical energy from the external line power. A second internal circuit has an ambient brightness sensor and a motion sensor. The second internal circuit is configured to generate, from the stored electrical energy, a second illumination below the first brightness value according to received signals from both the ambient brightness sensor and the motion sensor.

12 Claims, 4 Drawing Sheets

(56) References Cited

U.S. PATENT DOCUMENTS

| | | | |
|---|---|---|---|
| 2012/0169234 A1* | 7/2012 | Shew | H02J 9/065 |
| | | | 362/183 |
| 2014/0097758 A1* | 4/2014 | Recker | H02J 9/065 |
| | | | 315/297 |
| 2016/0073479 A1* | 3/2016 | Erchak | F21V 23/009 |
| | | | 315/51 |
| 2016/0192455 A1* | 6/2016 | Dubuc | H02J 9/061 |
| | | | 315/86 |
| 2018/0163934 A1* | 6/2018 | Miller | F21L 4/005 |
| 2019/0072250 A1* | 3/2019 | Huggins | H05B 45/14 |

* cited by examiner

BULB HAVING TWO-LEVEL ILLUMINATION

CROSS REFERENCE TO RELATED APPLICATIONS

This application claims the benefit of U.S. Provisional Application Ser. No. 62/794,025 entitled "Bulb Having Two-Level Illumination" by James Odorczyk, filed 18 Jan. 2019 and incorporated herein in its entirety.

TECHNICAL FIELD

The present disclosure relates generally to illumination devices and more particularly to a light bulb that operates in a standard illumination mode and, when power is shut off, in a low level night-light mode.

BACKGROUND

Many homes and institutions have some type of night light in order to provide better visibility of furniture or other obstacles that can cause difficulties for persons who need to move about in the dark without disturbing others, such as for using the restroom. The need for this activity can become more acute with an aging population, as well as for pregnant women or for people with various medical conditions. The use of a night light (e.g. in the range from about 10-12 lumens) is often considered a more suitable solution than using lights with higher lumen output (e.g. 800 lumens for typical 60 W bulb), particularly for its reduced impact on the circadian rhythm, which can affect the sleep cycle.

Night lights, however, can introduce other problems that can disrupt sleep, such as providing a continuous level of illumination. Various sophisticated solutions have been proposed, including providing night lights with movement sensors, etc. Such approaches may not be widely accepted, since they tend to add complexity and cost. Use of a night light can be further hampered by lack of a suitable outlet in an appropriate location.

In addition to conventional night-light situations, low-level illumination can be a useful aid to visibility in various locations, such as in hotels or other lodgings, or public places that serve people who are not familiar with the general floor plan or furniture location. Still other places where low-level illumination or reference lighting can be useful include stairways, passage ways, closets, and utility areas. In some cases, low-level light sources may even be appropriate to serve as or to support emergency lighting, such as for power outages.

There is thus a need for an uncomplicated solution to the need for a night light or other source of low-level illumination that can be energized at specific times, providing a suitable amount of light for visibility over an intended area, having spectral and brightness characteristics that do not negatively effect the circadian rhythm of a sleeper moving about in the darkness, and configured to operate without requiring special wiring, switches, or user setup.

SUMMARY

It is an object of the present disclosure to address the need for night light illumination.

The present disclosure provides a novel light bulb that has two levels of illumination. In a standard lighting mode, supplied with standard line power, the bulb provides conventional room lighting, at higher lumen levels. When switched off from the standard lighting mode, the bulb operates in an intermittent night light mode, providing a low level of illumination for night light operation when activated.

According to an embodiment of the present disclosure, there is provided a light bulb comprising:
a) a first internal circuit that is configured to generate, from received external line power, a first illumination above a first brightness value;
b) an internal charge storage element that is configured to store electrical energy from the external line power; and
c) a second internal circuit that comprises:
  (i) an ambient brightness sensor; and
  (ii) a motion sensor;
and wherein the second internal circuit is configured to generate, from the stored electrical energy, a second illumination below the first brightness value according to received signals from both the ambient brightness sensor and the motion sensor.

These aspects are given only by way of illustrative example, and such objects may be exemplary of one or more embodiments of the invention. Other desirable objectives and advantages inherently achieved by the disclosed invention may occur or become apparent to those skilled in the art. The invention is defined by the appended claims.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

DETAILED DESCRIPTION OF EXEMPLARY EMBODIMENTS

Figure 1:
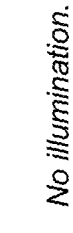
FIG. 1 is a chart that summarizes how a light bulb according to the present disclosure operates when installed in an indoor setting.

Figures provided herein are given in order to illustrate principles of operation and component relationships according to the present disclosure and are not drawn with intent to show actual size or scale. Some exaggeration may be necessary in order to emphasize basic structural relationships or principles of operation. Some conventional components that would be needed for implementation of the described embodiments, such as support components used for providing power, for packaging, and for mounting, for example, may not be shown in the drawings in order to simplify description. In the drawings and text that follow, like components are designated with like reference numerals, and similar descriptions concerning components and arrangement or interaction of components already described may be omitted.

Where they are used, the terms "first", "second", and so on, do not necessarily denote any ordinal or priority relation, but may be used for more clearly distinguishing one element or time interval from another. The term "plurality" means at least two.

In the context of the present disclosure, positional terms such as "top" and "bottom", "upward" and "downward", and similar expressions are used descriptively, to differentiate different surfaces, sides, or views of an assembly or structure and do not describe any necessary orientation of the assembly in an optical or electromechanical apparatus.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a partial subset of the larger set S, having one or more members selected only from set S and excluding at least one member of set S.

The lumen is the standard (Systeme International d'unites, SI-derived) unit of luminous flux, a measure of the total quantity of visible light emitted by a source per unit of time. By way of reference, a typical 40 W incandescent bulb generates approximately 450 lumens; a typical 60 W incandescent bulb emits light of approximately 800 lumens.

An embodiment of the present disclosure has the behavior that is shown in tabular form in FIG. 1. Behavior according to the FIG. 1 mapping addresses the need for variable lighting levels from a single light source. To provide suitable light for different conditions, a light bulb operates in two modes, based on whether or not external power, such as through a conventional light power switch, is applied:

(i) First mode: Power switch ON: In a first, normal operating mode, when external power to the bulb is switched ON, a first circuit within the bulb emits light for primary illumination and behaves similarly to a conventional light source, with an additional function of storing backup power to support auxiliary low-level light. The light source that is used for standard lighting provides illumination for normal room or background lighting, such as light of at least 325 lumens or higher.

(ii) Second mode: Power switch OFF: When external power is switched OFF, a second, low-level operating mode is provided by a second circuit, wherein the second circuit is also internal to the bulb housing/structure. The bulb generates light for secondary illumination only when the conditions shown in the table of FIG. 1 are met. With external power OFF, sensors provided by the bulb detect ambient conditions related to light and movement. When both darkness and motion conditions indicate the need for low-level light, the bulb can energize an alternate arrangement of its internal light sources for a predetermined time period. The low-level secondary illumination that is generated is at night-light or background illumination levels, and can be in the range of 200 lumens or lower for standard light bulb applications, depending on the amount of light useful or needed for a particular location and end-user. For conventional night-light use, the reduced brightness level for secondary illumination is typically 50-60 lumens or lower, for example.

Advantageously, a single bulb provides both first and second modes as described just above, without requiring a special lighting fixture and without added switches, external wiring or circuitry, connection to separate sensors, or operator controls. Moreover, the bulb can operate without any perceptible effect on normal operation and with no demands on operator intervention, automatically operating in the second operating mode only under particular conditions that are automatically detected.

A particularly useful application of the light bulb of the present disclosure is in a bedroom, a restroom/bathroom, or an access hallway between bedroom and bathroom. During waking hours, the light bulb is switched ON, operating in the first mode (i, above) to provide primary illumination as listed previously. Then, when external power to the light bulb is switched OFF, low-level light can be provided for second mode illumination for a period of time, but only when the bulb detects both darkness and motion. The bulb thus can serve as a night-light, providing secondary illumination at reduced brightness levels when, with external power off, the bulb senses that it is sufficiently dark and when bulb sensing further indicates that someone is moving within or between nearby rooms.

Studies of the relationship of light wavelengths to the circadian rhythm characteristic of the human subject indicate that visible light of longer wavelengths, such as red light, tends to be more favorable for use in night lights than light of shorter wavelengths. Red or red-orange light, with wavelengths typically between about 590 and 700 nm, tends to be more compatible with the sleep state. By comparison, shorter blue or blue-green wavelengths appear to be less favorable for night light use, since these shorter wavelengths can tend to awaken or stimulate the subject and thus work against the sleeping state.

As the summary of FIG. 1 shows, external power (typically alternating current or AC power, nominally 120V AC in the US) is generally provided to light bulb 10 using a light switch. Normal mode operation provides standard white-light illumination according to ON/OFF position of the light switch, typically a standard wall switch. Brightness is typical of standard bulb illumination, above 375 lumens, for example. As a measure of relative brightness, a 40 W incandescent bulb generates about 450 lumens; a 60 W incandescent bulb generates about 750-900 lumens.

The second operating mode is perceptible to the user only with the external light switch in the OFF position. Where ambient light in the room is sufficiently bright, no illumination is provided in this second mode. Further, in a dark room or other area, as long as no appreciable motion detected, zero illumination is provided. However, when the room is dark (ambient light levels sufficiently low) and motion is detected by the bulb, low-level illumination can be provided for a predetermined time period. The low-level illumination can be at or above night-light level, such as in a range from 12-60 lumens.

Figure 2:
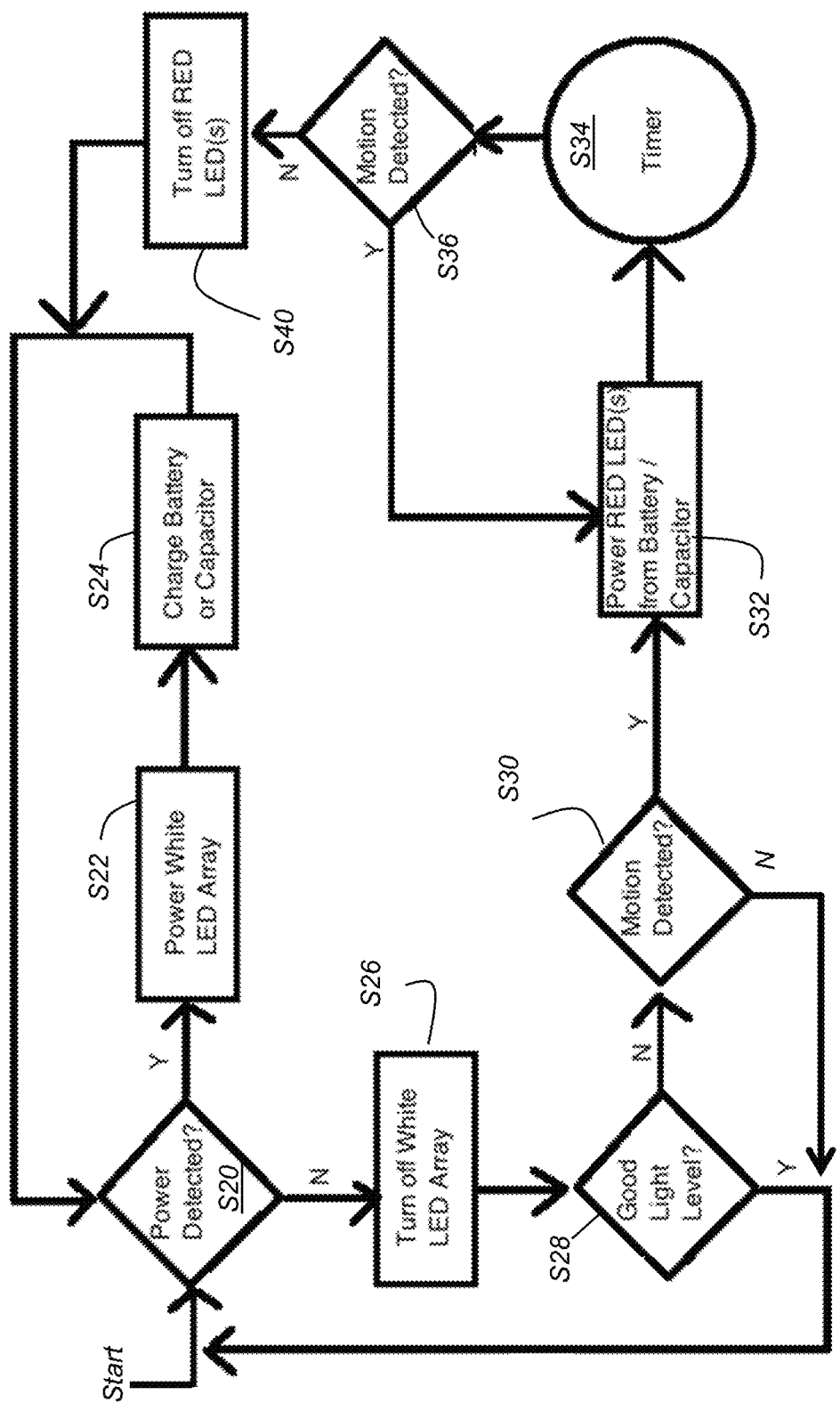
FIG. 2 is a logic flow diagram that describes light bulb operation and response.
Figure 3:
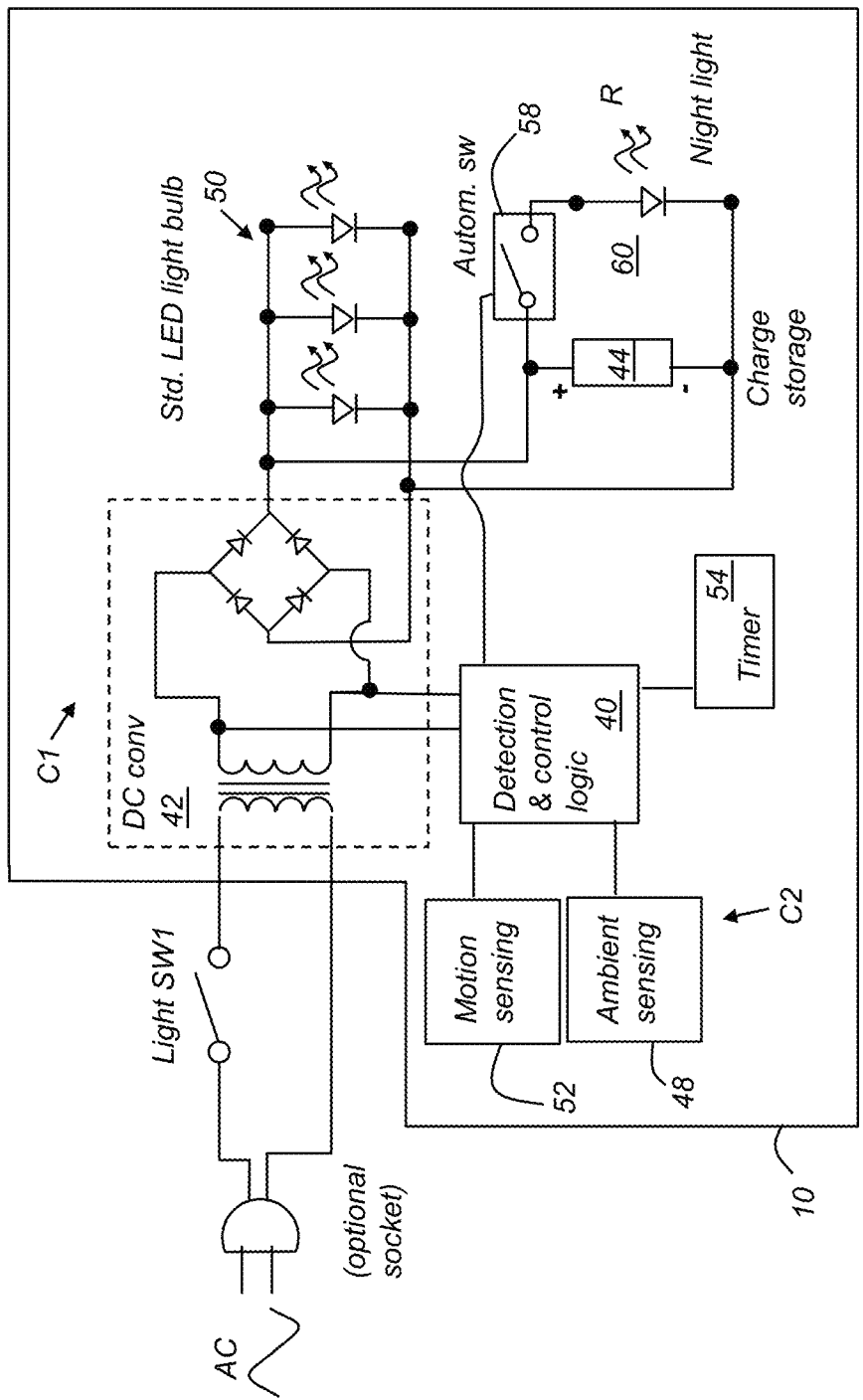
FIG. 3 is a schematic diagram for light bulb operation, showing components provided within the light bulb.

The logic flow diagram of FIG. 2 and schematic diagram of FIG. 3 show how light bulb 10 can operate, according to an embodiment of the present disclosure in which primary illumination is provided by a first internal circuit C1 that controls an array of light-emitting diodes (LEDs). It should be noted that FIG. 3 depicts use of LED bulbs for providing both standard white-light illumination and low-level night light (red) illumination. According to an alternate embodiment, light bulb 10 can provide either or both illumination types for first and second modes using incandescent, fluorescent, halogen, or other light generation technologies. Various spectral combinations can also be provided, including low-level white light or low-level light of some color other than red.

In order to provide the dual-mode operation described above with reference to FIG. 1, the light bulb 10 has additional power storage circuitry, internal to the bulb, such as within the base or housing of the bulb, that can be charged when external power is supplied, that is, when the light switch is ON. Power storage can use a rechargeable battery or a capacitor having sufficient storage capability for operating appropriate components once power is removed.

The schematic diagram of FIG. 3 shows components that form first internal circuit C1 and a second internal circuit C2 that, respectively, provide the first and second modes of light bulb 10 operation. From this aspect, first circuit C1 is configured to generate, from received external line power, a first illumination above a first brightness value. A charge storage element in charge storage circuit 44 is configured to store electrical energy from the external line power. Second internal circuit C2 has both an ambient brightness sensor 48 and a motion sensor 52. The second circuit C2 is configured to generate, drawing from the stored electrical energy provided from the charge storage element, a second illumination that has brightness below the first brightness value according to received signals provided from both the ambient brightness sensor and the motion sensor internal to the bulb.

Referring to both the logic flow of FIG. 2 and components in the schematic diagram of FIG. 3, the operational control logic for light bulb 10 begins with a power detection step S20 that monitors power from the light switch SW1, which is typically a standard wall switch, but could be any type of lamp switch, including a switch for a table lamp, for example. FIG. 3 shows control logic 40 monitoring power within a DC converter 42; alternately, the incoming AC current itself can be monitored for switch state detection. In an embodiment of the present disclosure, control logic 40 can be a programmed logic circuit or component. Alternately, control logic 40 can be a simple relay, solenoid, or other electromagnetic or electronic switching device that actuates to perform external power line sensing and internal switching from the first internal circuit C1 to the second internal circuit C2.

Detection and control logic 40 can be hard-wired or programmed circuitry that executes functions of the second operating mode within the bulb, as described earlier, when power switch SW1 is OFF.

If power is switched ON, the light bulb 10 is in the first mode described previously, with an LED array 50 or other standard primary illumination source energized in a white light emission step S22. In addition, a charging step S24 executes, providing charging current to an internal charge storage circuit 44. Charge storage circuit 44 can charge a rechargeable battery. Alternately, charge storage circuit 44 can charge a capacitor or other charge storage component that is fitted within the bulb housing.

As long as AC power is switched ON, the loop shown by FIG. 2 steps S20, S22, S24 executes, providing illumination and storing reserve power for subsequent operation during the second mode. When the AC power is switched OFF, this transition is detected by detection and control logic 40 and second mode operation begins, with an illumination off step S26, turning off the white light illumination from LED array 50 or other primary illumination source.

In an ambient light level sensing step S28, an ambient sensor 48 senses the level of ambient light and provides a corresponding signal, or change in signal state, indicating whether or not sufficient light (such as daylight) is present. If the ambient light level is good, no action is taken and general monitoring of power continues with step S20. If the ambient light level is poor, low-level illumination may be useful, depending on whether or not motion is sensed.

A subsequent motion detection step S30 indicates whether or not motion is detected within a zone. This may indicate, for example, that someone is moving through the dark room. A motion sensor 52 can be, for example, an infrared or acoustic sensor, with a zone define by sensor distance range. A signal can be provided by motion sensor 52 indicating the state of motion sensing. Similar to light level sensing, the motion detection signal can be a binary signal, for example, with a first signal state that is set when no motion is detected and a second signal state that is set when motion is detected.

If the room is dark, as reported in step S28 and motion is detected, as reported in step S30, a low-level illumination step S32 executes, energizing one or more low-level LEDs as night lights 60, such as by tripping an automatically controlled switch 58. In addition, a timing step S34 is also initiated. Timing step S34 actuates a timer 54 that effectively holds switch 58 in the closed (ON) position for a predetermined timeout period. As shown in FIG. 3, switch 58 closure conducts stored charge to night light 60. According to an embodiment of the present disclosure, the timed interval can be user-adjusted.

Following the timeout period, a second motion detection step S36 checks for continued motion and, if sensed, causes low-level illumination step S32 to continue for another cycle, resetting timer 54. If no further motion is sensed, a de-energizing step S40 trips switch 58 and operation is restored to power detection step S20.

It should be noted that turning ON the wall switch SW1 at any time during second mode operation pre-empts any second mode processing and restores bulb operation in the first mode, restoring primary illumination.

The operation for the particular embodiment described with reference to FIG. 2 can be modified in a number of ways within the scope of the present disclosure. For example, according to an alternate embodiment, the low-level lighting is turned ON whenever the power switch is OFF. This eliminates the need for ambient light sensing, motion detection, timing, and control functions. This embodiment also assumes that sufficient storage capacity is provided to support low-level LED illumination, but would require at least some charge-up time with the full illumination turned ON.

The schematic diagram of FIG. 3 shows one of a number of possible configurations for light bulb 10 and support components. For example:

(i) Charge storage circuit 44 can be replaced by a standard battery, eliminating the need for charging circuitry. The use of low-power LED lighting can make it practical to provide the described functions with the user simply replacing the battery annually, for example.

(ii) The low-level LED lighting may alternately use a partial subset of the components of the full white light LED array. Thus, for example, where the white light LED illumination is formed as a combination of individual color LEDs, components of one of the component colors can be used for the background light. Alternately, both operating modes can make use of the same array of white-light LED sources, with control logic 40 using the full set or energizing an appropriate subset of the LED sources for the needed light level. Thus, for example, primary white light emission in standard operation can energize the full array of LED sources. Low-level light emission then energizes a partial subset of the array of LED sources, such as one-half or one-third of the sources in the array, in order to provide a night-light function.

Figure 4A:
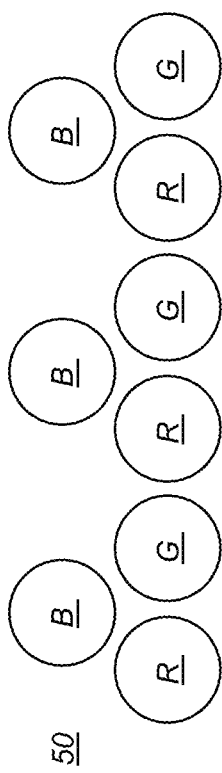
FIGS. 4A and 4B are schematic diagrams that show use of the full array and use of a partial subset for different modes of operation.
Figure 4B:
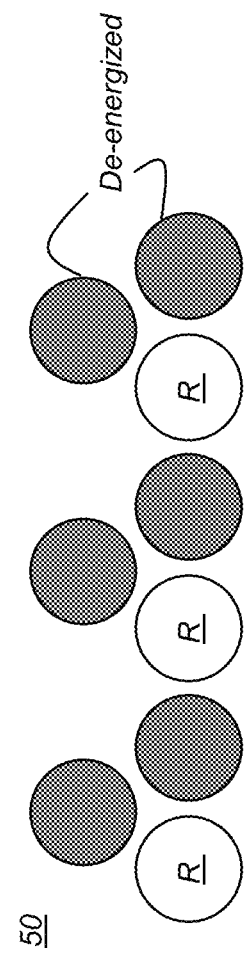

By way of example, FIGS. 4A and 4B, respectively, show use of the full light source array and use of a partial subset in schematic form. In FIG. 4A, LED array 50 generates polychromatic light or "white light" for the first mode, using triads of energized light sources R (red), G (green), and B (blue) as component colors. All sources R, G, and B can be simultaneously energized to generate polychromatic or "white" light. In FIG. 4B, second mode operation generates only red R light; the green G and blue B emitters are de-energized. It can be appreciated that various modifications of this scheme could be implemented, including using various arrangements of color filters, using complementary colors (cyan, magenta, yellow) or other multi-color arrangements, changing the subset color(s) that are energized, or selectively reducing power according to emitter color, for example. The secondary lighting can be dimmed or faded over time, as controlled by light bulb 10 circuitry.

The bulb 10 outline, outer shape and dimensions, and overall appearance can resemble that of standard light bulbs, such as standard bulbs with a conventional A19 shape or bulbs used in conventional "can" lighting housings or bulbs used in ceiling fixtures or table lamps and the like. Light bulb 10 can be fabricated with a standard screw base fitting, such as an industry-standard E26 screw base for installation in a conventional light fixture. This eliminates the need for wiring a special circuit to accommodate light bulb 10.

According to an embodiment of the present disclosure, the first or primary illumination is substantially white light over the visible spectrum between 400 and 740 nm and the second "night light" illumination is substantially red light between 600 and 740 nm. With respect to relative luminance for a light range, "substantially" means that greater than 70% of the measured luminance is for light over the indicated range. Luminance measurement can be made with a standard luminance meter; the measured value can be in terms of light power (W/cm$^2$) or candelas per unit area, such as per square meter (cd/m$^2$).

In addition to brightness reduction, the low-level light output of the second mode can have spectral content that differs from the spectral content of the first (normal) illumination mode. Thus, light of different wavelengths can be emitted, depending on whether the light bulb has external power turned ON or turned OFF. In addition, light sources having different angular spread or distribution can be used, such as providing broad angle light for primary illumination in the first mode and providing a narrower cone or line of light for secondary night-light illumination. According to an embodiment of the present disclosure, substantially all of the emitted light flux can be measured within a 120 degree cone centered at light bulb 10 in the first or primary mode. By comparison, in the second or night light mode, substantially all of the emitted light can be measured within an 80 degree cone centered at light bulb 10.

According to an embodiment of the present disclosure, the sensing zone for motion detection can be adjusted by the end-user, such as by a screw adjustment for detector sensitivity. Similarly, sensitivity for ambient brightness/darkness sensing can also be adjustable. According to an embodiment, bulb brightness can be operator-adjustable within a suitable range for either or both first and second mode operation.

For shipping and overall usability of light bulb 10 and for shipping and related considerations, it can be beneficial to suspend second mode operation, such as by removing battery power or other stored energy. A number of mechanisms can be provided for this purpose. A switch setting on light bulb 10 can temporarily disable operation in the second mode. Alternately, a piece of tape or other non-conductive tab can be temporarily positioned to open electrical power connection between at least one set of terminals. In yet another alternate embodiment, an operator sequence for suspending mode two operation can be implemented, such as using rapid ON/OFF setting of primary power two or more times from the wall switch or other power switching device. An enabling mechanism that enables bulb operation in both modes only after the bulb has been fully screwed into the socket or has been twisted to a particular angular position with respect to the socket can be used.

The invention has been described in detail with particular reference to certain preferred embodiments thereof, but it will be understood that variations and modifications can be effected within the spirit and scope of the invention. For example, any of a number of circuitry arrangements could be used in order to switch between first and second mode operation of the light bulb.

I claim:
1. A light bulb comprising:
   a) a base configured for insertion in a lighting socket and having a first and a second line power input as AC contacts for receiving incoming AC line power at the base;
   b) an internal charge storage element within the base that is configured to store electrical energy from the incoming AC line power;
   c) a first set of a plurality of light emitters within the bulb that provide white light illumination over the visible spectrum between 400 and 740 nm,
   wherein the first set of emitters is energized only when incoming AC line power is applied to the AC contacts of the bulb;
   d) a second set of one or more light emitters within the bulb, separate and disjoint from the first set, and providing red light substantially between 600 and 740 nm,
   wherein the second set of emitters is energizable only when switched to the internal charge storage element, and
   wherein the second set of emitters is energizable only when AC line power is absent at the AC contacts of the bulb;
   e) a detector, internal to the base and configured for monitoring the incoming AC line power to the light bulb at the first and second line power inputs at the base and for providing a signal that indicates loss of the incoming AC line power,
   wherein the detector is further connected to sensors within the base that indicate the following:
      i) ambient brightness about the light bulb below a predetermined level; and
      ii) sensed motion over an area lying within a predetermined distance of the base;
   and
   f) a switching element within the base that connects to the detector and, in response to the detector signal and to both sensor indications, switches the internal charge storage element to energize the second set of light emitters within the light bulb.

2. The light bulb of claim 1 wherein the plurality of light emitters of both first and second sets are light-emitting diodes.

3. The light bulb of claim 1 wherein the charge storage element is a rechargeable battery.

4. The light bulb of claim 1 wherein the charge storage element is a capacitor.

5. The light bulb of claim 1 wherein the red light illumination is below 60 lumens.

6. The light bulb of claim 1 further comprising a timer that de-energizes the second set of light emitters after a pre-defined period.

7. The apparatus of claim 1 further comprising a timer, within the base, that is configured to maintain, for a predetermined time period, the energized state of the second set of light emitters by the internal charge storage element.

8. A method for illumination comprising:
   a) providing a light bulb with a base configured for insertion in a lighting socket and having a first and a second line power input as AC contacts for receiving incoming AC line power;
   b) defining a first set of a plurality of light emitters within the light bulb, that provide white light over the visible spectrum between 400 and 740 nm, and a second set of one or more light emitters within the light bulb, separate and disjoint from the first set, and providing red light substantially between 600 and 740 nm, and wherein the second set is separate and disjoint from the first set,
   wherein the first set of emitters is energized only when incoming AC line power is applied to the AC contacts of the bulb;
   wherein the second set of emitters is energizable only when switched to the internal charge storage element, and
   wherein the second set of emitters is energizable only when AC line power is absent at the AC contacts of the bulb;
   c) configuring a first circuit formed within the base to condition the received AC line power to energize the first set of light emitters and to store electrical energy from the conditioned line power in an internal charge storage element within the base;
   d) disposing a detector, internal to the base, configured for monitoring the incoming line power to the light bulb at the first and second line power inputs at the base and for providing a first signal that indicates loss of the AC line power, and connecting the detector to sensors within the base that indicate the following:
      i) ambient brightness about the light bulb below a predetermined level; and
      ii) sensed motion over an area lying within a predetermined distance of the base;
   and
   e) connecting a switching element within the base to the detector, wherein the switching element is configured to respond to the first detector signal and to both sensor indications by switching the internal charge storage element to energize the second set of light emitters within the light bulb.

9. The method of claim 8 wherein the internal charge storage element is a battery.

10. The method of claim 8 wherein the internal charge storage element is a capacitor.

11. The method of claim 8 further comprising de-energizing the second set of light emitters according to a predetermined timeout period.

12. The method of claim 8 further comprising providing a switch or non-conductive tab on the base that disables energizing of the second set of light emitters.

* * * * *